US010940799B2

(12) United States Patent
Nozaki et al.

(10) Patent No.: US 10,940,799 B2
(45) Date of Patent: Mar. 9, 2021

(54) INNER REAR-VIEW DEVICE FOR VEHICLE (71) Applicant: Ichikoh Industries, Ltd., Isehara (JP)

(72) Inventors: Kenji Nozaki, Isehara (JP); Masayuki Iwaki, Isehara (JP); Keisuke Honda, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 16/637,482

(22) PCT Filed: Aug. 8, 2018

(86) PCT No.: PCT/JP2018/029749
§ 371 (c)(1),
(2) Date: Feb. 7, 2020

(87) PCT Pub. No.: WO2017/031542
PCT Pub. Date: Feb. 14, 2019

(65) Prior Publication Data
US 2020/0247320 A1 Aug. 6, 2020

(30) Foreign Application Priority Data

Aug. 8, 2017 (JP) .............................. JP2017-153020

(51) Int. Cl.
B60R 1/02 (2006.01)
B60R 1/04 (2006.01)
B60R 1/12 (2006.01)
H04N 7/18 (2006.01)
B60R 11/04 (2006.01)

(52) U.S. Cl.
CPC ................ B60R 1/025 (2013.01); B60R 1/04 (2013.01); B60R 1/12 (2013.01); H04N 7/18 (2013.01); B60R 11/04 (2013.01); B60R 2001/1215 (2013.01); B60R 2300/8066 (2013.01)

(58) Field of Classification Search
None
See application file for complete search history.

(56) References Cited

U.S. PATENT DOCUMENTS

2014/0347488 A1* 11/2014 Tazaki ...................... B60R 1/00
348/148
2016/0236620 A1* 8/2016 Gomez Timoneda ......................
B62D 65/16

FOREIGN PATENT DOCUMENTS

JP 2002184480 A * 6/2002 ........... H01R 9/2425
JP 2002-187480 A 7/2002
(Continued)

OTHER PUBLICATIONS

International Search Report dated Oct. 23, 2018 in PCT/JP2018/029749 filed on Aug. 8, 2018.

Primary Examiner — James M Anderson, II
(74) Attorney, Agent, or Firm — Oblon, McClelland, Maier & Neustadt, L.L.P.

(57) ABSTRACT

The present invention provides an inner rear-view device for a vehicle that includes a stay, a pivot, a bracket, a housing, a knob, a rear-view unit, a switching mechanism, a fixed engagement section, an elastically-engaged section, an elastically-deformed section, and a suppressing section. The inner rear-view device for the vehicle can adjust angles of a screen and the like and prevent movement of a knob at the time of angle adjustment of the screen and the like even when pivot torque is increased by a magnitude that corresponds to an increase in masses of the housing and the like.

6 Claims, 9 Drawing Sheets

(56) References Cited

FOREIGN PATENT DOCUMENTS

| JP | 2013-244752 A | 12/2013 | | |
|----|---------------|---------|---|---|
| JP | 2013-244753 A | 12/2013 | | |
| JP | 2013244752 A | * 12/2013 | ............... | B60R 1/04 |
| JP | 2013244753 A | * 12/2013 | ............... | B60R 1/00 |

* cited by examiner

INNER REAR-VIEW DEVICE FOR VEHICLE

TECHNICAL FIELD

The present invention relates to an inner rear-view device for a vehicle.

BACKGROUND ART

Inner rear-view devices for a vehicle provided inside the vehicle and visually recognizing a place behind the vehicle are disclosed in PTL 1, PTL 2, and PTL 3, for example. A vehicle rear-view mirror in PTL 1 includes a stay, a pivot, a bracket, a mirror housing, a mirror body, and an operation lever. The bracket is provided with an engagement recess, and the operation lever is provided with an upper end engagement section having a long hole that allows flexure. The upper end engagement section is in elastic contact with the engagement recess.

In the vehicle rear-view error disclosed in PTL 1, when the operation lever rotates with respect to the bracket, the upper end engagement section of the operation lever rotates with respect to the engagement recess of the bracket while being elastically deformed. In conjunction with this, the mirror housing is tilted with respect to the bracket. In this way, an orientation of the mirror body is switched between an upward orientation suited for use during daytime and a downward orientation suited for use in nighttime. In addition, in the rear-view mirror for the vehicle disclosed in PTL 1, when, together with the bracket and the mirror body, the mirror housing is tilted around a center of the pivot, an angle of a mirror surface of the mirror body can be adjusted according to a field of view of a user (mainly a driver). That is, the angle of the mirror surface can be adjusted.

Each of inner mirror systems for the vehicle disclosed in PTL 2, 3 includes a support arm, a casing, a display, a half mirror, an operation lever member, and a power switch. In each of the inner mirror systems for the vehicle disclosed in PTL 2, 3, when the operation lever member is operated, an orientation of the casing is changed to a posture at the time when the driver sees a screen of the display and a posture at the time when the driver sees a place behind the vehicle reflected in the half mirror. In addition, when the power switch is operated in an interlocking manner with the operation of the operation lever member, the display is switched between ON and OFF. In each of the inner mirror systems for the vehicle disclosed in PTL 2, 3, angles of the screen of the display and the half mirror surface (hereinafter referred to as the "screen and the like") cannot be adjusted.

CITATION LIST

Patent Literature

PTL 1: Japanese Unexamined Patent Application Publication No. 2002-187480
PTL 2: Japanese Unexamined Patent Application Publication No. 2013-244752
PTL 3: Japanese Unexamined Patent Application Publication No. 2013-244753

SUMMARY OF THE INVENTION

Problems to be Solved by the Invention

Here, in the vehicle rear-view error, which is disclosed in PTL 1 and in which the angle of the mirror surface can be adjusted with the pivot, instead of the mirror body, the display, the half mirror, and the power switch in each of the vehicle inner mirror systems, which are disclosed in PTL 2, 3 and in which the angles of the screen and the like cannot be adjusted, may be attached to the mirror housing.

In this case, a mirror surface angle adjusting mechanism that includes the pivot, the bracket, and the like in the vehicle rear-view mirror disclosed in PTL 1 can adjust the angles of the screen and the like. Meanwhile, in this case, masses of the display, the half mirror, and the power switch are larger than a mass of the mirror body. Thus, masses of the mirror housing and the like are increased, which possibly causes the mirror housing and the like to oscillate with respect to the pivot due to vibrations of the vehicle and further causes the screen of the display and the half mirror surface to oscillate. For this reason, it is necessary to increase pivot torque (a holding force with which the bracket is held by the pivot) by a magnitude that corresponds to an increase in the masses of the mirror housing and the like, so as to prevent the oscillation of the screen of the display and the half mirror surface.

In the case where the pivot torque is increased, the pivot torque is increased with respect to an operation load of the operation lever. As a result, the operation lever possibly moves when the angles of the screen and the like are adjusted. That is, when the pivot torque is increased, a force that tilts the mirror housing and the like becomes larger than the operation load of the operation lever. Thus, the operation lever possibly moves with the force that tilts the mirror housing and the like.

When the operation lever moves, the power switch that interlocks with the operation of the operation lever member is possibly operated, and ON/OFF of the display is possibly switched. In addition, when the operation lever moves, the screen of the display before the angle adjustment of the screen and the like is possibly changed to the half mirror surface after the angle adjustment of the screen and the like. Alternatively, the half mirror surface before the angle adjustment of the screen and the like is possibly changed to the screen of the display after the angle adjustment of the screen and the like.

However, in the vehicle rear-view mirror disclosed in PTL 1, the upper end engagement section is simply in elastic contact with the engagement recess, and the operation load of the operation lever is simply set to a predetermined value. Thus, means for setting the large operation load of the operation lever is not provided. For this reason, the vehicle rear-view mirror in PTL 1 has such a problem that, when the pivot torque is increased, the operation lever moves during the angle adjustment of the screen and the like. In addition, in the vehicle inner mirror systems disclosed in PTL 2, 3, the angles of the screen and the like cannot be adjusted.

In order to solve the above problem, the present invention provides an inner rear-view device for a vehicle capable of adjusting angles of a screen and the like and capable of preventing movement of a knob at the time of angle adjustment of the screen and the like even when pivot torque is increased by a magnitude that corresponds to an increase in masses of a housing and the like.

Means for Solving the Problem

An inner rear-view device for a vehicle according to the present invention includes: a stay, one end of which is attached to a vehicle body via an attachment mechanism; a pivot provided at another end of the stay; a bracket rotatably attached to the pivot; a housing attached to the bracket in a manner to be rotatable between a first posture and a second posture; a knob attached to the housing and engaged with the bracket in a manner capable of being switched between a first position and a second position; a rear-view unit attached to the housing and visually recognizing a place behind a vehicle; and a switching mechanism switching the housing from the first posture to the second posture or from the second posture to the first posture when the knob is switched from the first position to the second position or from the second position to the first position. The switching mechanism includes: a fixed engagement section provided on the bracket; an elastically-engaged section provided on the knob and elastically engaged with the fixed engagement section and an elastically-deformed section elastically deformed when the knob is switched; and a suppressing section suppressing elastic deformation of the elastically-deformed section.

In the inner rear-view device for the vehicle according to the present invention, the rear-view unit preferably includes: a display for displaying a situation behind the vehicle, which is captured by an imaging device, as an image on a display surface; a switch actuating the display when the housing is switched to the first posture and stopping the display when the housing is switched to the second posture; and a mirror provided on a surface or a surface side of the display surface, transmitting the image on the display surface when the housing is in the first posture, and reflecting the situation behind the vehicle as a reflected image when the housing is in the second posture.

In the inner rear-view device for the vehicle according to the present invention, the knob preferably includes: a main body; a shooting section provided in the main body for switching operation of the knob; a shaft section that is provided in the main body in a direction crossing a direction in which the shooting section is provided, and is rotatably attached to the housing; and the elastically-engaged section and the elastically-deformed section provided in the main body.

In the inner rear-view device for the vehicle according to the present invention, the suppressing section is preferably provided in at least one of the knob, the housing, and the bracket, the suppressing section provided on the knob preferably abuts at least one of the housing and the bracket, and the suppressing section provided on the housing and the suppressing section provided on the bracket preferably abuts the elastically-deformed section.

Effect of the Invention

The inner rear-view device for a vehicle according to the present invention can adjust angles of a screen and the like, and can prevent movement of the knob during the angle adjustment of the screen and the like even when pivot torque is increased by a magnitude that corresponds to an increase in masses of the housing and the like.

MODE FOR CARRYING OUT THE INVENTION

A detailed description will hereinafter be made on two examples of an embodiment (examples) of an inner rear-view device for a vehicle according to the present invention with reference to the drawings. In the present specification, front, back, up, down, left, and right are front, back, up, down, left, and right at the time when a vehicle is equipped with the rear-view device for the vehicle according to the present invention.

In the drawings, the reference symbols "F", "B", "U", "D", "L", and "R" respectively represent "front", "back", "up", "down", "left", and "right". In addition, since the drawings are schematic views, main components are illustrated while components other than the main components are not illustrated, and hatched portions are partially omitted.

(Description on Configuration of First Embodiment)

FIG. 1 to FIG. 6 and FIG. 9 each illustrate a first embodiment the inner rear-view device for the vehicle according to the present invention. A description will hereinafter be made on a configuration of the inner rear-view device for the vehicle according to this first embodiment.

(Description on Inner Rear-View Device 1 for Vehicle)

An inner rear-view device for a vehicle 1 according to this first embodiment is illustrated in the drawings. The inner rear-view device for the vehicle 1 includes a stay 2, an attachment mechanism, a pivot 20, a bracket 3, and a housing 4, a knob 5, a rear-view unit 6, and a switching mechanism 7.

(Description on Stay 2)

Figure 1:
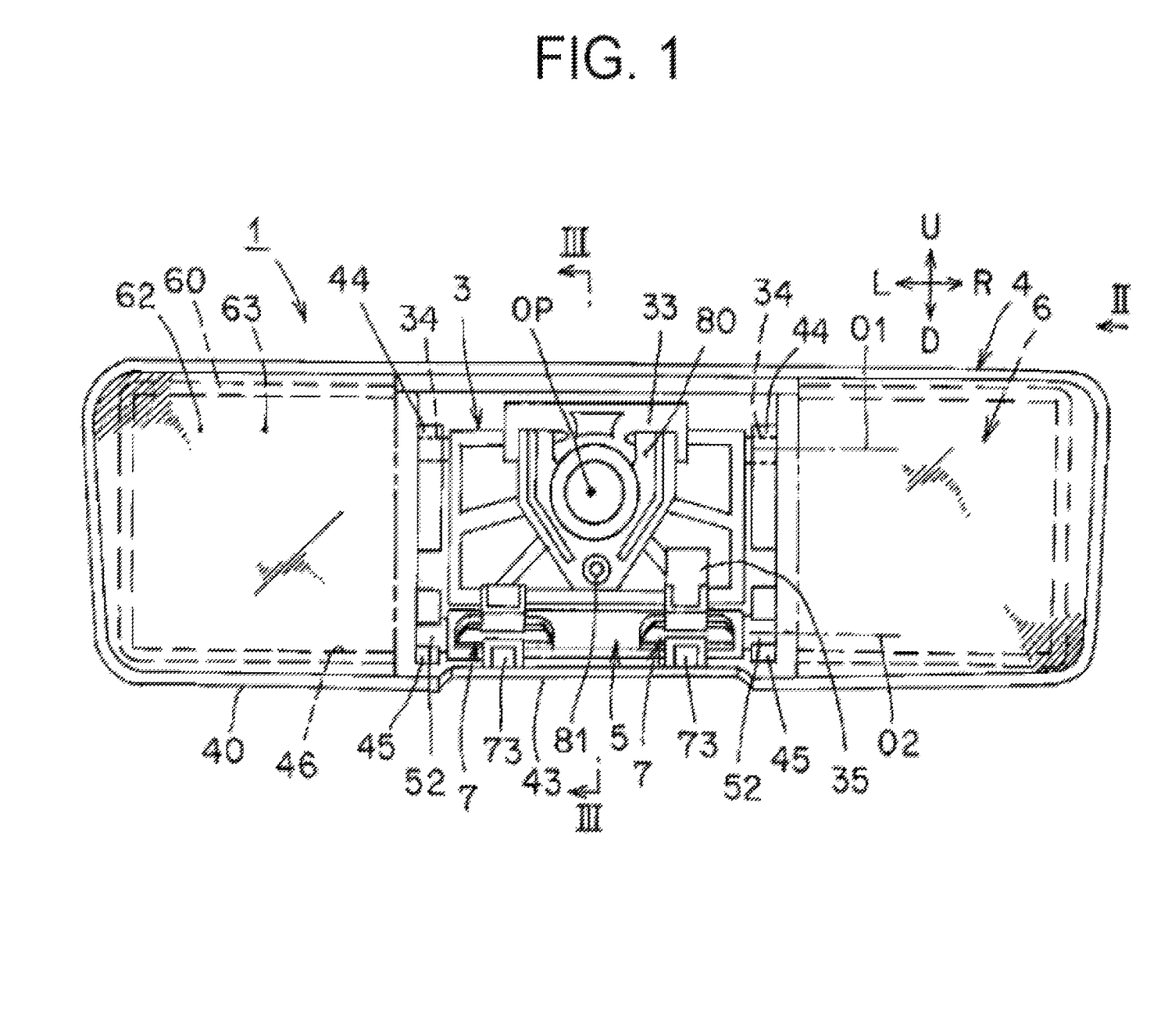
FIG. 1 is a partially broken front view (a view taken along arrow I in FIG. 2 in which a part of a rear-view unit is broken) illustrating a first embodiment of an inner rear-view device for a vehicle according to the present invention.
Figure 2:
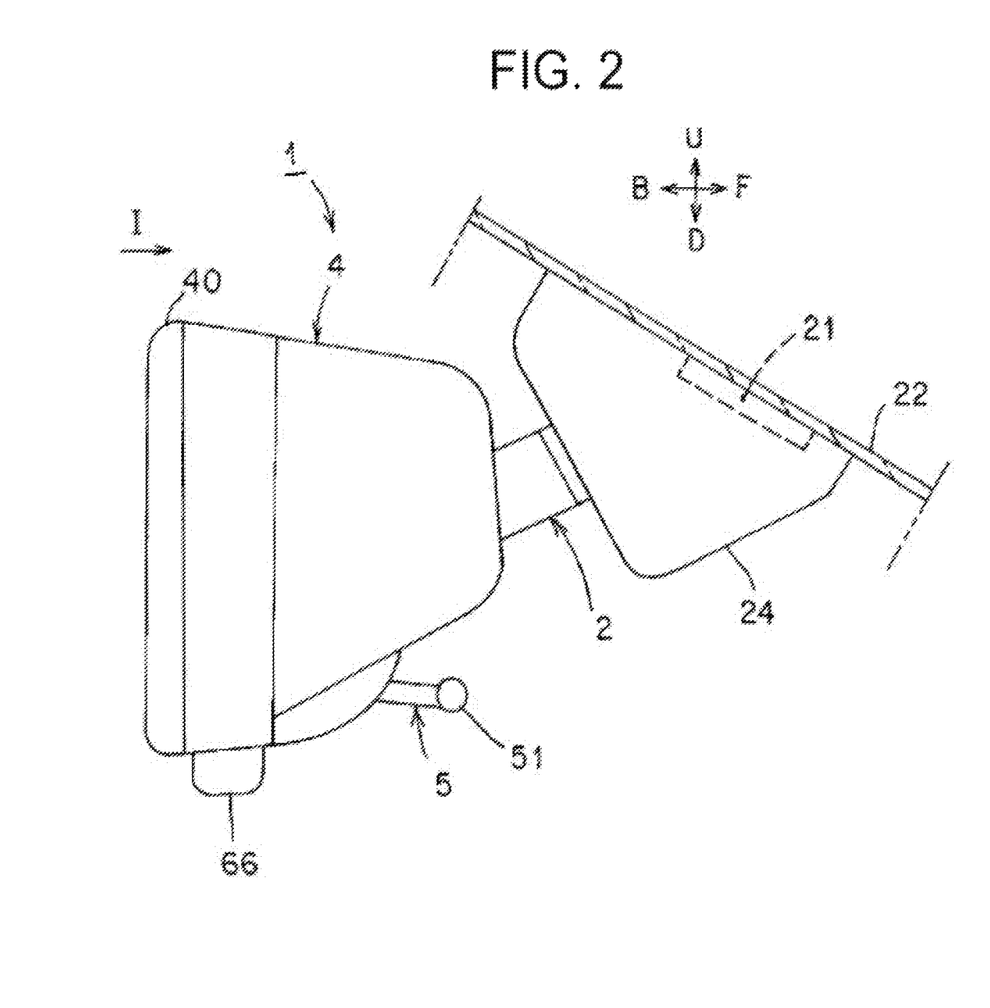
FIG. 2 is a side view illustrating a state of use (a view taken along arrow II in FIG. 1).

As illustrated in FIG. 2, one end (a front end) of the stay 2 is detachably attached to a vehicle body, in this example, a front windshield 22 of a vehicle V via the attachment mechanism. In this example, the stay 2 has a columnar shape or a substantially columnar shape and is formed of a metal member. Note that, instead of the front windshield 22, the stay 2 may be detachably attached to a ceiling 23 (see FIG. 9) of the vehicle V via the attachment mechanism.

(Description on Attachment Mechanism)

The attachment mechanism has: a base 21 that is a fixed member fixed to the front windshield 22; and an elastic member (not illustrated) that is an attachment member detachably attached to the base 21 via a screw (not illustrated). The one end of the stay 2 is attached to the elastic member. In this way, when a force that is equal to or larger than a specified value is applied to the housing 4 and the like, the elastic member is detached from the base 21, and the stay 2 is detached from the base 21 or the front windshield 22 (the ceiling 23). A cover 24 in FIG. 2 covers the one end of the stay 2 and the attachment mechanism including the base 21 and the like.

(Description on Pivot 20)

Figure 3:
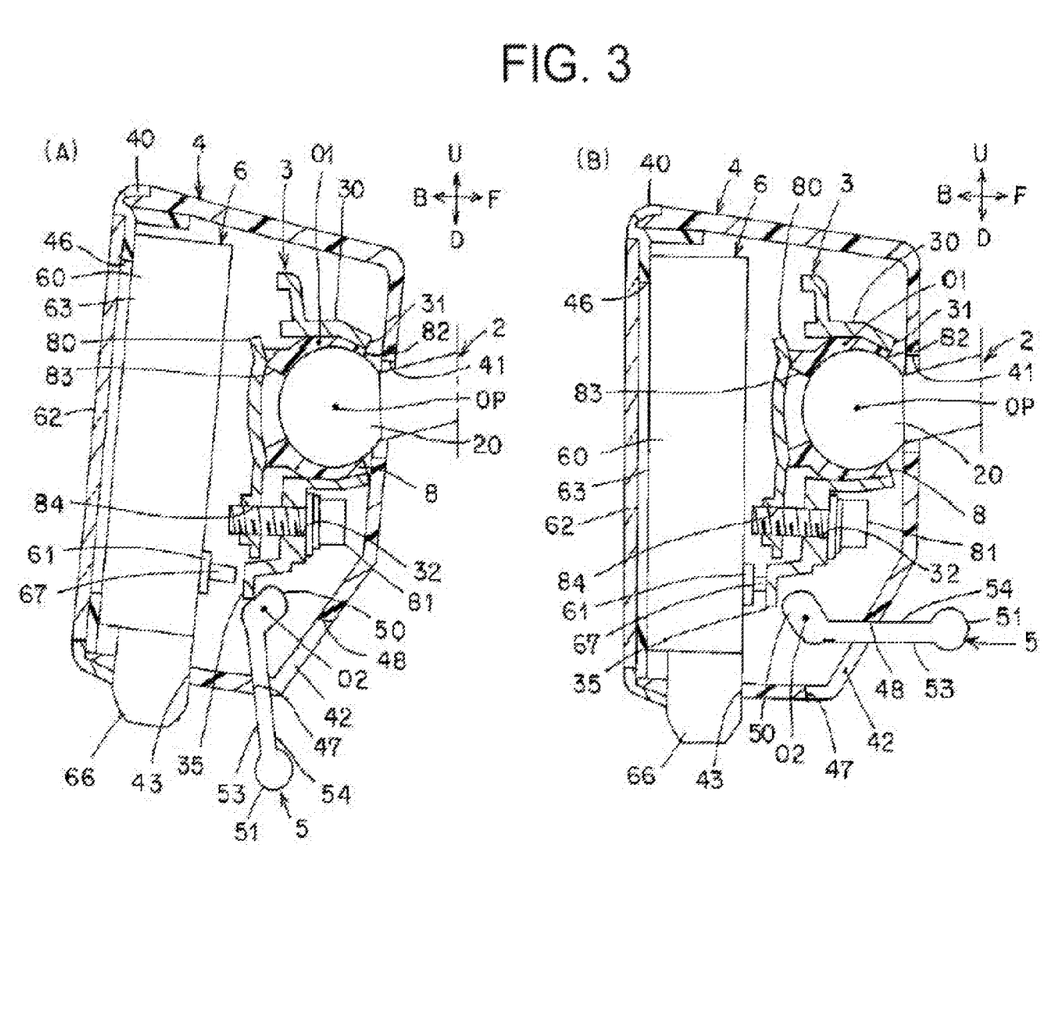
FIG. 3 includes vertical cross-sectional views (cross-sectional views taken along line in FIG. 1) illustrating the state of use, in which (A) is a vertical cross-sectional view at the time when the knob is switched to a first position and a housing is switched to a first posture (in a display mode) and (B) is a vertical cross-sectional view at the time when the web is switched to a second position and the housing is switched to a second posture (in a mirror mode).
Figure 4:
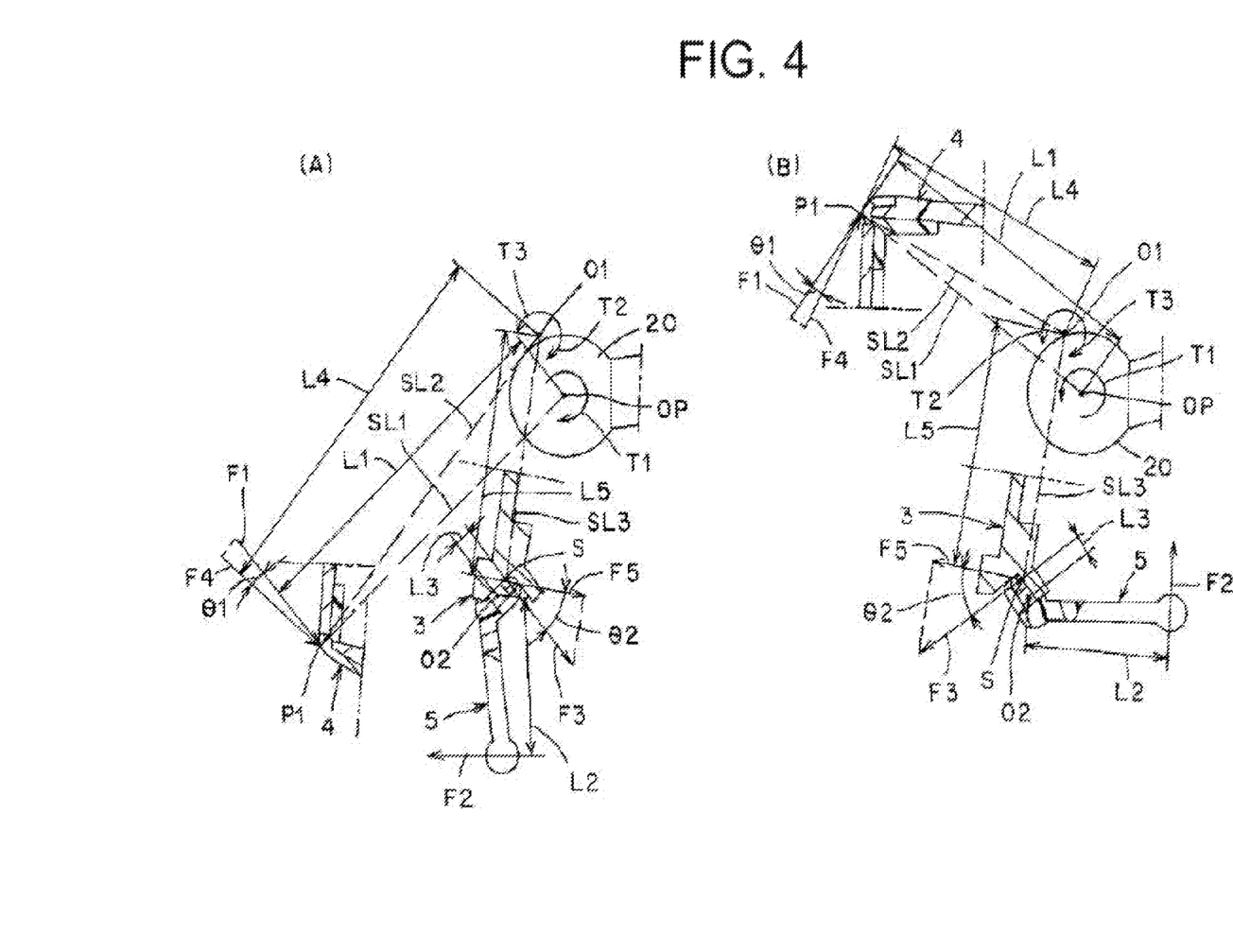
FIG. 4 includes explanatory views illustrating actuation states at the time of adjusting angles of a screen and the like, in which (A) is an explanatory view illustrating the actuation state at the time of adjusting angles of the screen and the like in the display mode and (B) is an explanatory view illustrating the actuation state at the time of adjusting the angles of the screen and the like in the mirror mode.

As illustrated in FIG. 3 and FIG. 4, the pivot 20 is integrally provided at another end (a back end) of the stay 2. In this example, the pivot 20 has a spherical shape or a substantially spherical shape and, similar to the stay 2, is formed of a metal member.

(Description on Bracket 3)

As illustrated in FIG. 1 and FIG. 3 to FIG. 6, the bracket 3 is rotatably attached to the pivot 20 via a bush 8, a pressing plate 80, and a screw 81. In this example, the bracket 3 has a substantially rectangular plate shape when a front side of the vehicle V is seen from a back side thereof (hereinafter referred to as a "front-view shape"), and is formed of a metal member.

In a substantially central portion of the bracket, a ball recess 30 is provided in a manner to be recessed to the front. A through hole 31 is provided in a bottom portion of the ball recess 30. An insertion hole 32 is provided in a lower portion of the ball recess 30 of the bracket 3. A locking section 33 is integrally provided at a center of an upper side of the bracket 3. Each of shaft sections 34 is integrally provided at an upper end of both of left and right sides of the bracket 3. Each is provided in one piece. A switch abutment section 35 is integrally provided on a right side of a lower side of the bracket 3.

In this example, the bush 8 has a hollow spherical shape and is formed of a resin or rubber member. A through hole 82 and an opening 83 are respectively provided in a front portion and back portion of the bush 8. In this example, the pressing plate 80 has a substantially hexagonal plate shape as the front-view shape and is formed of a metal member. A locking section (not illustrated) is integrally provided in an upper side of the pressing plate 80. A screw hole 84 is provided at a lower end of the pressing plate 80.

An inner peripheral surface of the bush 8 is fitted to an outer peripheral surface of the pivot 20 from the outside. An inner peripheral surface of the ball recess 30 of the bracket 3 is fitted to an outer peripheral surface of bush 8 from the outside. The other end of the stay 2 is inserted through the through hole 82 of the bush 8 and the through hole 31 of the bracket 3. The locking section 33 of the bracket 3 and the locking section of the pressing plate 80 are locked to each other in a state where the pressing plate 80 covers the opening 83 of the bush 8. The screw 81 is inserted through the insertion hole 32 of the bracket 3. The screw 81 is screwed in the screw hole 84 of the pressing plate 80.

In this way, the bracket 3 is attached to the pivot 20 in a rotatable manner about a center OP of the pivot 20 (hereinafter referred to as "about the pivot 20") via the bush 8, the pressing plate 80, and the screw 81. The pivot 20, the bracket 3, the bush 8, the pressing plate 80, and the screw 81 constitute a ball joint that attaches the housing 4, the knob 5, the rear-view unit 6, and the switching mechanism 7 (hereinafter referred to as the "housing 4 and the like") to the other end of the stay 2.

(Description on Housing 4)

As shown in FIG. 1 to FIG. 4 and FIG. 6, the housing 4 is attached to the shaft section 34 of the bracket 3 in a rotatable manner about a center line (see FIG. 1, hereinafter referred to as a "first rotation center line") O1 of the shaft section 34. In this example, the housing 4 has a hollow rectangular parallelepiped shape and is formed of a resin member.

A back portion of the housing 4 is opened, and a rim 40 is fitted and fixed to an entire periphery of an opening edge. An upper through hole 41 and a lower through hole 42 are respectively provided on an upper side and a lower side of a central portion in a front portion of the housing 4. A notch 43 is provided in a central portion in a lower portion of the housing 4. A first bearing 44 and a second bearing 45 are integrally provided at positions on an inner surface (a back surface) of the front portion of the housing 4 and on an upper side and a lower side of each of left and right portions of the bracket 3, respectively. The rim 40 is provided with a horizontally-elongated rectangular window 46. A first stopper surface 47 and a second stopper surface 48 are respectively provided on an inner surface of the lower through hole 42.

The left and right shaft sections 34 of the bracket 3 are rotatably supported by the left and right first bearings 44 in the housing 4, respectively. In this way, the housing 4 is attached to the bracket 3 in a rotatable manner about the first rotation center line O1 between a first posture (a posture illustrated in FIG. 3(A)) and a second posture (a posture illustrated in FIG. 3(B)). The other end of the stay 2 is inserted through the upper through hole 41 of the housing 4. An inner surface of the upper through hole 41 and an outer surface of the stay 2 have such dimensions that the housing 4 rotates about the first rotation center line O1 between the first posture and the second posture and that the inner surface of the upper through hole 41 and the outer surface of the stay 2 do not abut each other when the housing 4 rotates about the pivot 20.

(Description on Knob 5)

As illustrated in FIG. 1 to FIG. 6, the knob 5 is attached to the housing 4 and is engaged with the bracket 3 in a manner to allow a switching operation between a first position (a position illustrated in FIG. 3(A)) and a second position (a position illustrated in FIG. 3(B)). In this example, a front-view shape of the knob 5 is a substantially T-shaped plate shape, and the knob 5 is formed of a resin member.

A shooting section 51 is integrally provided in a lower portion of a main body 50 in the knob 5. On each of left and right sides of the main body 50, each of shaft sections 52 is integrally provided in a direction that crosses a direction in which the shooting section 51 is provided (an orthogonal direction or a substantially orthogonal direction). The left and right shaft sections 52 of the knob 5 are respectively borne by the left and right second bearings 45 of the housing 4 in a rotatable manner about a center line O2 of the shaft section 52 in the knob 5 (hereinafter referred to as a "second rotation center line"). In this way, the knob 5 is attached to the housing 4 in the rotatable manner about the second rotation center line O2.

The shooting section 51 of the knob 5 is inserted through the lower through hole 42 of the housing 4. A first stopper surface 53 and a second stopper surface 54 are respectively provided on an outer surface of the shooting section 51. The first stopper surface 53 of the knob 5 and the first stopper surface 47 of the housing 4 are stoppers that abut each other to place the knob 5 at the first position when the knob 5 is switched from the second position side to the first position side. The second stopper surface 54 of the knob 5 and the second stopper surface 48 of the housing 4 are stoppers that abut each other to place the knob 5 at the second position when the knob 5 is switched from the first position side to the second position side.

(Description on Rear-View Unit 6)

As illustrated in FIG. 1 to FIG. 3 and FIG. 9, the rear-view unit 6 is attached to the housing 4 and visually recognizes a place hind the vehicle V. The rear-view unit 6 has a display 60, a switch 61, and a mirror 62.

Figure 9:
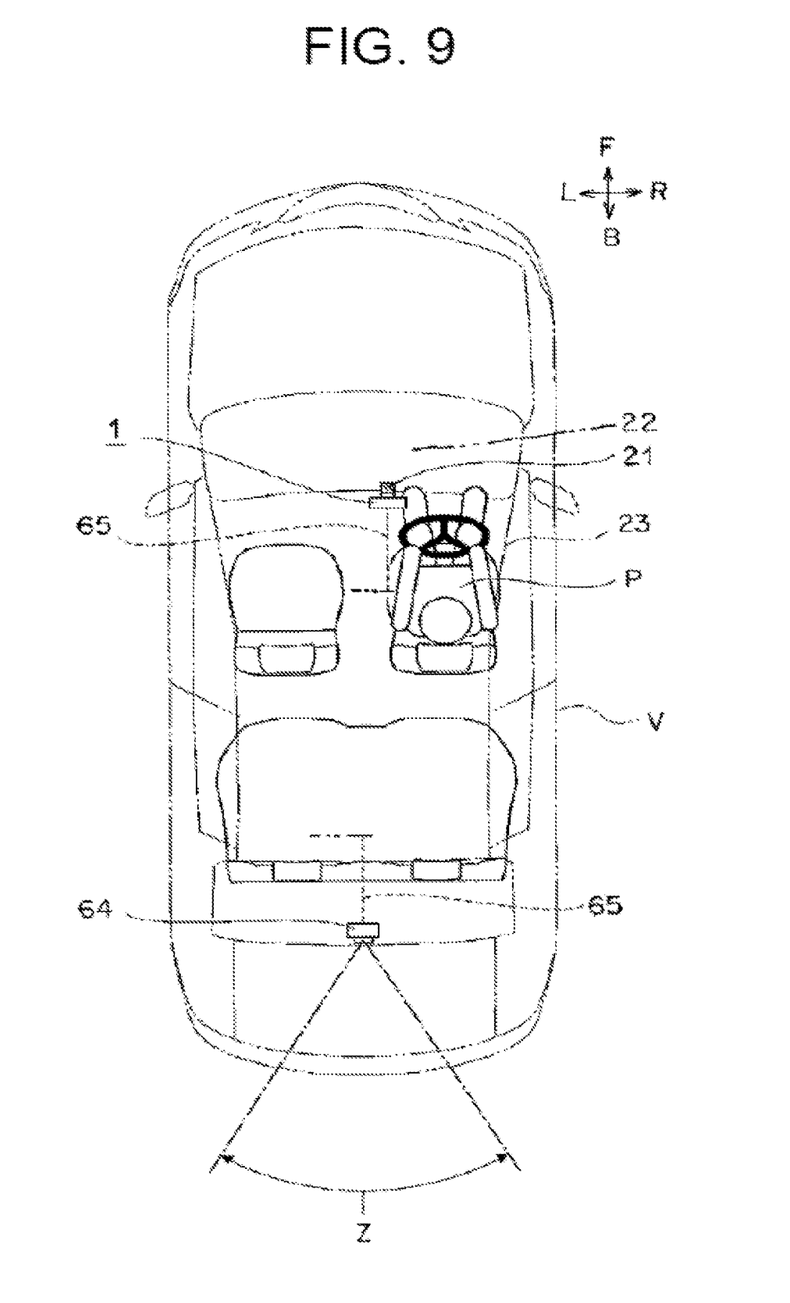
FIG. 9 is an explanatory plan view of the vehicle illustrating the state of use.

In this example, the display 60 is a liquid-crystal monitor and has a display surface 63. In a state where the display surface 63 faces the window 46 of the rim 40 of the housing 4, the display 60 is attached inside the housing 4 with the display surface 63. The display 60 shows a situation behind the vehicle V, which is captured by an imaging device 64, as an image on the display surface 63. The imaging device 64 is provided outside the vehicle V and at a center on the back side thereof, and captures the image of the situation behind the vehicle V. A range Z in FIG. 9 is a range where the imaging device 64 captures the image. The display 60 and the imaging device 64 are connected to each other via a signal line 65 and the image processor (not illustrated). The situation behind the vehicle V, which is captured by the imaging device 64, is displayed as the image on the display surface 63 of the display 60 via the signal line 65 and the image processor.

An adjustment section 66 used to adjust a color tone, brightness, and the like of the image on the display surface 63 is provided in a lower portion of the display 60. The adjustment section 66 is projected from the notch 43 of the housing 4 to a lower side of the housing 4.

The switch 61 is attached to a lower side of a front surface of the display 60 in a manner to oppose the switch abutment section 35 of the bracket 3. The switch 61 is provided with an actuator 67 that is actuated by separating from or abutting the switch abutment section 35. When the housing 4 is switched to the first posture, the actuator 67 is in a state of being separated from the switch abutment section 35 of bracket 3, and the switch 61 actuates the display 60 to show the image on the display surface 63. When the housing 4 is switched to the second posture, the actuator 67 is in a state of abutting the switch abutment section 35 of the bracket 3, and the switch 61 stops the display 60 and erases the image displayed on the display surface 63.

In the state of covering the window 46 of the rim 40 of the housing 4, the mirror 62 is provided on a surface or a surface side of the display surface 63 of the display 60. The mirror 62 transmits the image on the display surface 63 of the display 60 when the housing 4 is in the first posture, and reflects the situation behind the vehicle V as a reflected image when the housing 4 is in the second posture. The mirror 62 is a so-called half error.

(Description on Switching Mechanism 7)

As illustrated in FIG. 1 and FIG. 4 to FIG. 6, the switching mechanism 7 switches the housing 4 from the first posture to the second posture or from the second posture to the first posture by performing the switching operation of the knob 5 from the first position to the second position or from the second position to the first position. The switching mechanism 7 includes a fixed engagement section 70, an elastically-engaged section 71, an elastically-deformed section 72, and a suppressing section 73.

The fixed engagement section 70 is provided on both of the left and right sides of the lower side of the bracket 3. The fixed engagement section 70 has a recessed cross section, and is formed of a recess 700 of a valley portion, a first stopper surface 701 as a back surface of the recess 700, and a second stopper surface 702 as a front surface of the recess 700.

The elastically-engaged section 71 and the elastically-deformed section 72 are provided between the main body 50 of the knob 5 and each of the left and right shaft sections 52. The elastically-engaged section 71 has a cross-sectional projected shape and is formed of a projection 710 of a peak portion, a first stopper surface 711 as a back surface of the projection 710, and a second stopper surface 712 as a front surface of the projection 710. A long hole 713 for applying elasticity to the projection 710 is provided between the main body 50 of the knob 5 and each of the left and right shaft sections 52. Instead of the long hole 713, a long groove may be adopted.

Figure 6:
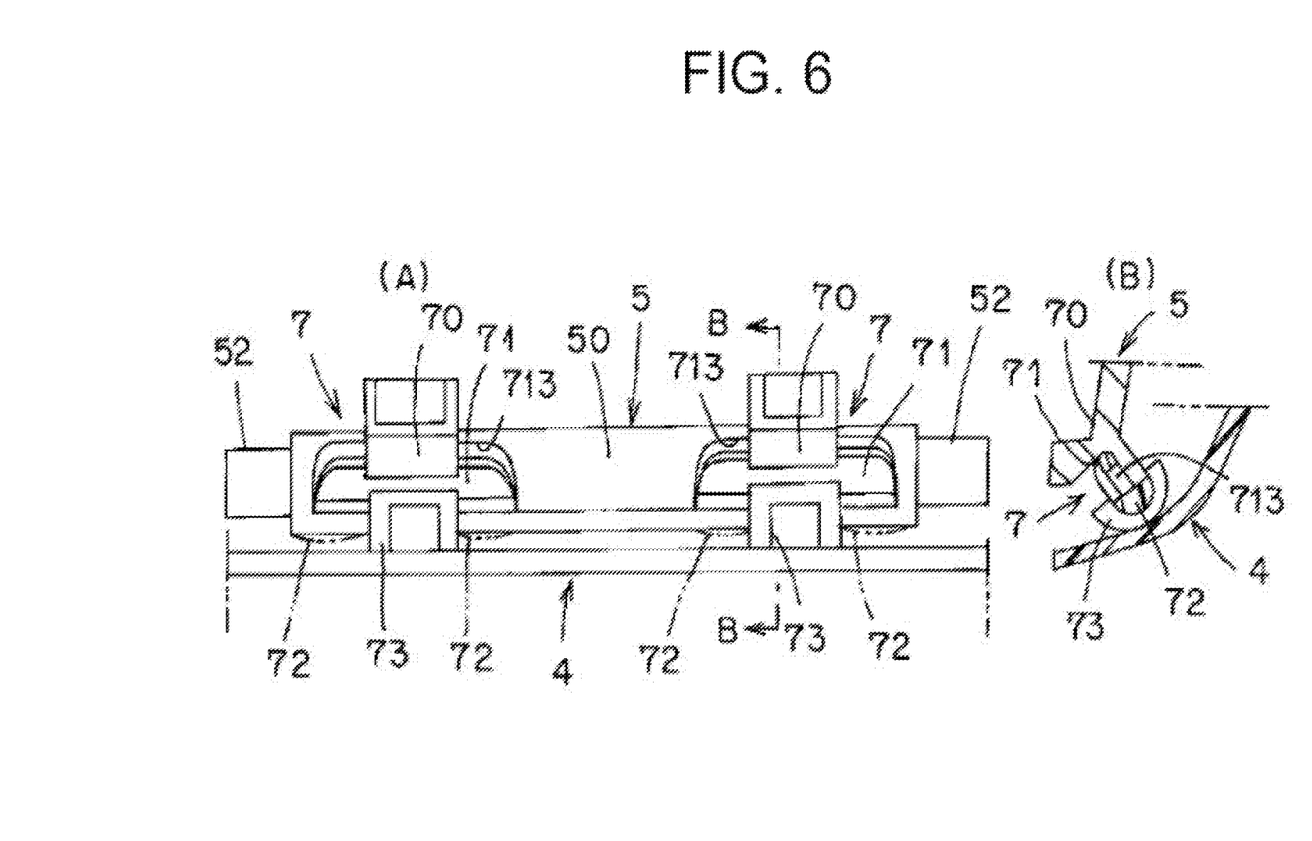
FIG. 6 includes explanatory views illustrating elastic deformation of an elastically-deformed section and an actuation state of a suppressing section, in which (A) is a partial front explanatory view and (B) is a cross-sectional explanatory view taken along B-B line in (A).

In this way, the projection 710 of the elastically-engaged section 71 is elastically engaged with the recess 700 of the fixed engagement section 70. An elastic engagement position between the projection 710 of the elastically-engaged section 71 and the recess 700 of the fixed engagement section 70 (hereinafter simply referred to as an "elastic engagement position") serves as a fulcrum S at the time when the knob 5 is switched from the first position to the second position or from the second position to the first position. As indicated by a two-dot chain line in FIG. 6(A), the elastically-deformed section 72 is elastically deformed when the knob 5 is subjected to the switching operation.

The first stopper surface 701 of the fixed engagement section 70 and the first stopper surface 711 of the elastically-engaged section 71 serve as a stopper in which the first stopper surface 701 and the first stopper surface 711 abut each other to place the knob 5 at the first position when the knob 5 is switched from the second position side to the first position side with the elastic engagement position as the fulcrum S. The second stopper surface 702 of the fixed engagement section 70 and the second stopper surface 712 of the elastically-engaged section 71 serve as a stopper in which the second stopper surface 702 and the second stopper surface 712 abut each other to place the knob 5 to the second position when the knob 5 is switched from the first position side to the second position side with the elastic engagement position as the fulcrum S.

The stopper constructed of the first stopper surface 701 and the second stopper surface 702 in the fixed engagement section 70 and the first stopper surface 711 and the second stopper surface 712 in the elastically-engaged section 71 is a stopper that is similar to the stopper constructed of the first stopper surface 53 and the second stopper surface 54 in the knob 5 and the first stopper surface 47 and the second stopper surface 48 in the housing 4. Accordingly, at least one of the stopper constructed of the first stopper surface 701 and the second stopper surface 702 in the fixed engagement section 70 and the first stopper surface 711 and the second stopper surface 712 in the elastically-engaged section 71 and the stopper constructed of the first stopper surface 53 and the second stopper surface 54 in the knob 5 and the first stopper surface 47 and the second stopper surface 48 in the housing 4 only needs to be provided. Note that the stoppers may be provided at positions other than those described above.

The suppressing section 73 is integrally provided with the elastically-deformed section 72 in the knob 5. The suppressing section 73 has a semicircular shape or a substantially semicircular shape when seen from the side. An arcuate surface of the suppressing section 73 abuts an inner surface (an upper surface) in the lower portion of the housing 4. In this way, the suppressing section 73 suppresses the elastic deformation of the elastically-deformed section 72.
(Description on Action of First Embodiment)

The inner rear-view device for the vehicle 1 according to the first embodiment is configured as described so far, and a description will hereinafter be made on an action thereof.
(Description on In-Vehicle Equipment in Inner Rear-View Device 1 for Vehicle)

As illustrated in FIG. 2 and FIG. 9, the base 21 of the attachment mechanism is fixed to the front windshield 22 (or the ceiling 23) as the vehicle body with an adhesive, mechanical fixing means, or the like. The elastic member, to which the one end of the stay 2 is attached, in the attachment mechanism is detachably attached to the base 21 by the screw. In this way, the one end of the stay 2 is detachably attached to the vehicle body via the attachment mechanism. As a result, the inner rear-view device for the vehicle 1 is installed in the vehicle (in a cabin of the vehicle V). The inner rear-view device for the vehicle 1 is located behind the base 21 in the vehicle 1. A driver P is positioned behind the inner rear-view device for the vehicle 1 in the vehicle V.
(Description on Angle Adjustment of Screen and the Like)

Any portion of the housing 4 is held by a hand or like to cause the rotation of the housing 4 about the pivot 20 according to a field of view of the driver P. Then, starting with the housing 4, the bracket 3, the bush 8, the pressing plate 80, the screw 81, the knob 5, the rear-view unit 6, and the switching mechanism 7 (hereinafter referred to as the "bracket 3, the housing 4, and the like") rotate about the pivot 20. In this way, the angles of the display surface 63 of the display 60 and a reflective surface of the mirror 62 in the rear-view unit 6 are regulated to a state that matches the field of view of the driver P.
(Description on Posture Switching of Housing 4 by Switching Operation of Knob 5)

Figure 5:
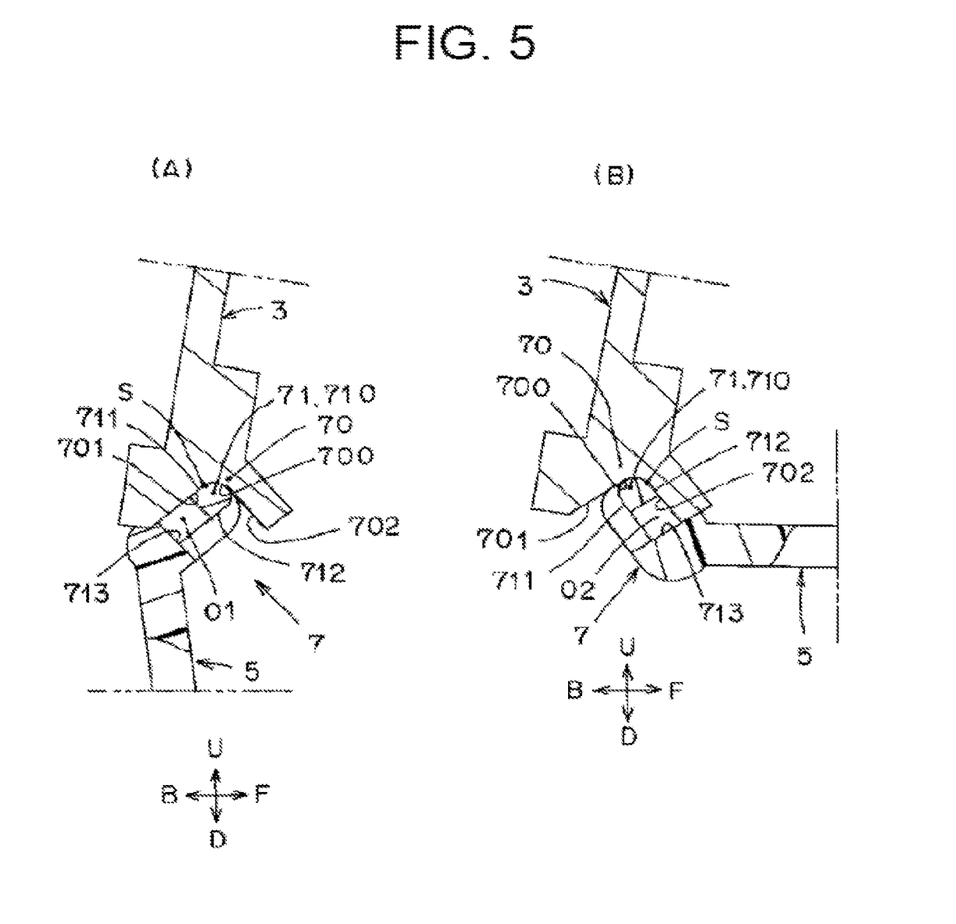
FIG. 5 includes explanatory views illustrating actuation states of a switching mechanism, in which (A) is an explanatory view illustrating the actuation state of the switching mechanism in the display mode and (B) is an explanatory view illustrating the actuation state of the switching mechanism in the mirror mode.

The shooting section 51 of the knob 5 is pinched by fingers or the like, so as to switch the knob 5, which is located at the second position, to the first position with the elastic engagement position as the fulcrum S. Then, as illustrated in FIG. 3(A), FIG. 4(A), and FIG. 5(A), the first stopper surface 53 of the knob 5 and the first stopper surface 711 of the elastically-engaged section 71 in the switching mechanism 7 respectively abut the first stopper surface 47 of the housing 4 and the first stopper surface 701 of the fixed engagement section 70, and consequently, the knob 5 is located at the first position. By the switching operation of the knob 5, the housing 4 in the second posture rotates about the first rotation center line O1 and set in the first posture. In this way, the housing 4 and the like are switched to the first posture with respect to the ball joint.

The shooting section 51 of the knob 5 is pinched by the fingers or the like, so as to switch the knob 5, which is located at the first position, to the second position with the elastic engagement position as the fulcrum S. Then, as illustrated in FIG. 3(B), FIG. 4(B), and FIG. 5(B), the second stopper surface 54 of the knob 5 and the second stopper surface 712 of the elastically-engaged section 71 in the switching mechanism 7 respectively abut the second stopper surface 48 of the housing 4 and the second stopper surface 702 of the fixed engagement section 70, and consequently, the knob 5 is located at the second position. By the switching operation of the knob 5, the housing 4 in the first posture rotates about the first rotation center line O1 and set in the second posture. In this way, the housing 4 and the like are switched to the first posture with respect to the ball joint.
(Description on Image on Display Surface 63 of Display 60)

As illustrated in FIG. 3(A), FIG. 4(A), and FIG. 5(A), in a display mode, that is, when the knob 5 is located at the first position and the housing 4 is in the first posture, the actuator 67 of the switch 61 is in a state of being separated from the switch abutment section 35 of the bracket 3. As a result, when the actuator 67 of the switch 61 is not pressed, the display 60 is actuated, and the situation behind the vehicle V, which is captured by the imaging device 64, is displayed as the image on the display surface 63. The image on the display surface 63 is transmitted through the mirror 62 and enters the field of view of the driver P. The driver P visually recognizes the image of the situation behind the vehicle V on the display surface 63 of the display 60 and can thereby grasp the situation behind the vehicle V.
(Description on Reflected Image on Reflective Surface of Mirror 62)

As illustrated in FIG. 3(B), FIG. 4(B), and FIG. 5(B), in a mirror mode, that is, when the knob 5 is located at the second position and the housing 4 is in the second posture, the actuator 67 of the switch 61 is in a state of abutting the switch abutment section 35 of the bracket 3. As a result, when the actuator 67 of the switch 61 is pressed, the actuation of the display 60 is stopped, and the image displayed on the display surface 63 disappears. In this way, the situation behind the vehicle V is reflected by the reflective surface of the mirror 62 and enters, as the reflected image, the field of view of the driver P. The driver P visually recognizes the reflected image of the situation behind the vehicle V, which is reflected on the reflective surface of the mirror 62, and can thereby grasp the situation behind the vehicle V.
(Description on Application of Force During Angle Adjustment of Screen and the Like)

For example, as illustrated in FIG. 4(A), when the knob 5 is located at the first position and the housing 4 is in the first posture, a housing operating force F1 is applied to cause counterclockwise rotation of the housing 4 about the pivot 20 from an obliquely upper side to an obliquely lower side in a direction. At this time, in the case where rotation torque (F1×L1) generated by the housing operating force F1 is larger than clockwise pivot torque T1, the bracket 3, the housing 4, and the like rotate about the pivot 20. Here, L1 is a distance between the center OP of the pivot 20 and a housing operating force input point P1.

In addition, as illustrated in FIG. 4(B), when the knob 5 is located at the second position and the housing 4 is in the second posture, the housing operating force F1 is applied to cause clockwise rotation of the housing 4 about the pivot 20 from the obliquely lower side to the obliquely upper side. At this time, in the case where the rotation torque (F1×L1) generated by the housing operating force F1 is larger than the counterclockwise pivot torque T1, the bracket 3, the housing 4, and the like rotate about the pivot 20.
(Description on Application of Force During Switching Operation of Knob 5)

As illustrated in FIG. 4(A), the knob 5 is switched from the second position to the first position with a knob operating force F2 with the elastic engagement position as the fulcrum S. At this time, in the case where a product of the knob operating force F2 and a knob operating length L2 (F2×L2) is larger than a product of knob torque (a knob operation load) F3 and a knob bracket abutment surface length L3 (F3×L3), the knob 5 is switched from the second position to the first position, and the housing 4 and the like are switched from the second posture to the first posture. The knob operating length L2 is a distance between a knob operation force application point P2 and the second rotation center line O2. The knob bracket abutment surface length L3 is a distance between the second rotation center line O2 and the fulcrum S. The knob torque F3 is perpendicular to a knob bracket abutment surface and opposite to a direction of the knob operating force F2.

In addition, as illustrated in FIG. 4(B), the knob 5 is switched from the first position to the second position with the knob operating force F2 and the elastic engagement position as the fulcrum S. At this time, in the case where the product of the knob operating force F2 and the knob operating length L2 (F2×L2) is larger than the product of the knob torque (the knob operation load) F3 and the knob bracket abutment surface length L3 (F3×L3), the knob 5 is switched from the first position to the second position, and the housing 4 and the like are switched from the first posture to the second posture.

(Description on Relative Relationship Between Pivot Torque T1 and Knob Torque F3)

A description will hereinafter be made on a relative relationship between the pivot torque T1 and the knob torque F3. As illustrated in FIG. 4(A), when the housing operating force F1 is applied at the housing operating force input point P1, clockwise rotation torque T2 is applied to the bracket 3 around the first rotation center line O1. The rotation torque T2 is rotation torque that is applied by the housing operating force F1, and is equal to F4×L4. L4 is a distance between the first rotation center line O1 of the bracket 3 and an input point P1. F4 is an input component of the housing operating force F1 to the bracket 3 and is an input component that is applied perpendicularly to the distance L2 at the input point P1. An angle θ1 that is defined by the housing operating force F1 and the input component F4 at the input point P1 is equal to an angle between a line segment SL1 that connects the input point P1 and the center OP of the pivot 20 and a line segment SL2 that connects the input point P1 and the first rotation center line O1. In FIG. 4(B), the rotation torque T2 is applied counterclockwise.

In addition, as illustrated in FIG. 4(A), when the knob operating force F2 is applied at the knob operation force application point P2, counterclockwise rotation torque T3 is applied to the bracket 3 around the first rotation center line O1. The rotation torque T3 is rotation torque that is applied by the knob operating force F2, and is equal to F5×L5. L5 is a distance between the first rotation center line O1 of the bracket 3 and the fulcrum S. F5 is an input component of the knob operating force F2 to the bracket 3. At the fulcrum S, the input component F5 is perpendicular to a line portion SL3 that connects the first rotation center line O1 and the fulcrum S and has an angle θ2 defined with the knob torque F3. In FIG. 4(B), the rotation torque T3 is applied clockwise.

Here, in the case where the pivot torque T1 is smaller than a specified value with respect to the knob torque F3, the rotation torque T2 that is applied to the bracket 3 around the first rotation center line O1 is smaller than the knob torque F3. As a result, when the bracket 3, the housing 4, and the like rotate about the pivot 20 during the angle adjustment of the screen and the like, the knob 5 is stopped at a specified position of the first position or the second position.

However, in the case where the pivot torque T1 is equal to or larger than the specified value with respect to the knob torque F3, the rotation torque T2 that is applied to the bracket 3 around the first rotation center line O1 is larger than the knob torque F3. As a result, when the bracket 3, the housing 4, and the like rotate about the pivot 20 during the angle adjustment of the screen and the like, the knob 5 possibly becomes free from the specified position at the first position or the second position and moves from the specified position.

Just as described, the pivot torque T1 and the knob torque F3 are in a relative relationship in which the knob 5 is stopped at the specified position or moves from the specified position when the bracket 3, the housing 4, and the like rotate about the pivot 20 during the angle adjustment of the screen and the like.

(Description on Effects of First Embodiment)

The inner rear-view device for the vehicle 1 according to this first embodiment has the configuration and exerts the action as described so far, and a description will hereinafter be made on effects thereof.

In the inner rear-view device for the vehicle 1 according to this first embodiment, the housing 4 and the like are rotatably attached to the pivot 20 at the other end of the stay 2 via the bracket 3. Thus, when the bracket 3, the housing 4, and the like rotate about the pivot 20, the angles of the screen and the like can be adjusted according to the field of view of the driver P.

Figure 7:
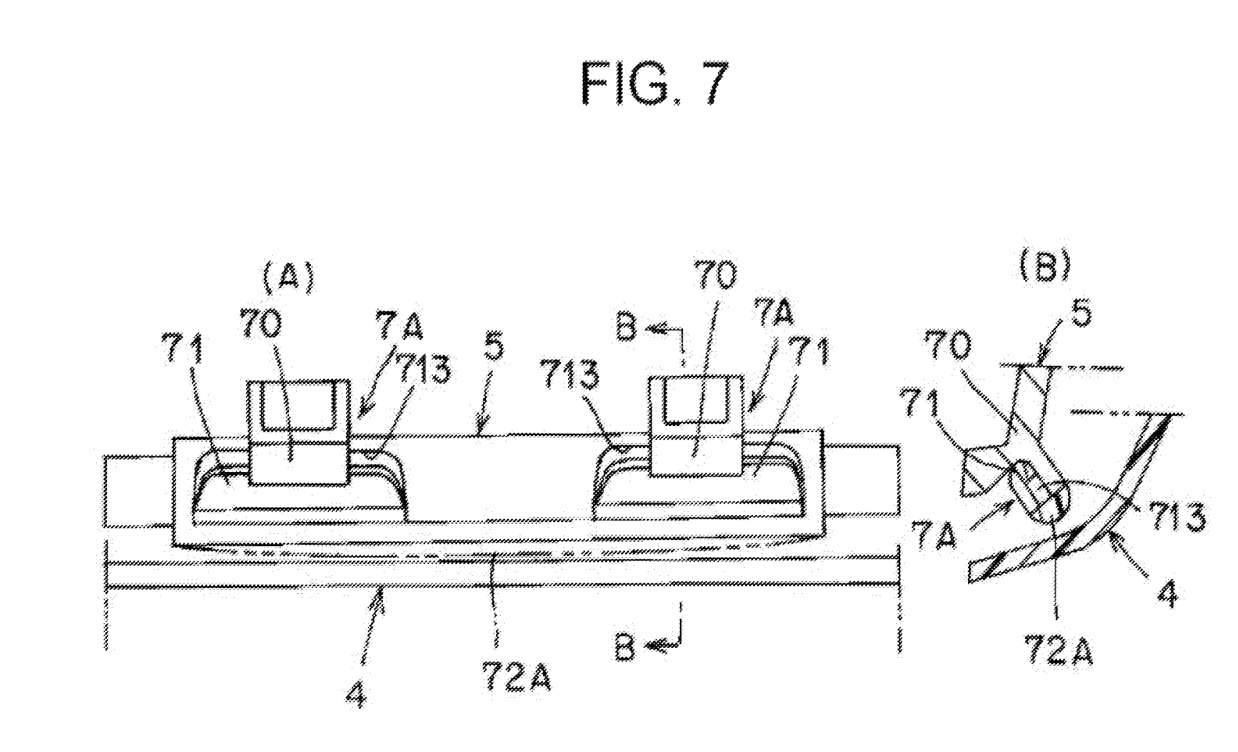
FIG. 7 includes explanatory views illustrating the elastic deformation of the elastically-deformed section in the case where the present invention is not implemented, in which (A) is a partial front explanatory view and (B) is a cross-sectional explanatory view taken along B-B line in (A).

In addition, in the inner rear-view device 1 for the vehicle according to this first embodiment, the switching mechanism 7 is provided with the suppressing section 73 that suppresses elastic deformation of the elastically-deformed section 72 elastically deformed in the switching operation of the knob 5. Accordingly, in the inner rear-view device for the vehicle 1 according to this first embodiment, an elastic deformation amount of the elastically-deformed section 72 (see a two-dot chain line in FIG. 6(A)) by the suppressing section 73 of the switching mechanism 7 is smaller than an elastic deformation amount (see a two-dot chain line in FIG. 7(A)) of an elastically-deformed section 72A of a switching mechanism 7A that is not provided with the suppressing section 73 illustrated in FIGS. 7(A) and 7(B). In this way, in the inner rear-view device for the vehicle 1 according to this first embodiment, compared to the switching mechanism 7A that is not provided with the suppressing section 73, the knob torque F3 that is the operation load of the knob 5 can be increased.

In this way, in the inner rear-view device for the vehicle 1 according to this first embodiment, even in the case where the display 60, the mirror 62, and the switch 61 having large masses are attached to the housing 4 instead of the mirror body, and the pivot torque T1 is increased by a magnitude corresponding to an increase in the masses of the bracket 3, the housing 4, and the like, it is possible to prevent movement of the knob 5 during the angle adjustment of the screen and the like. That is, when the bracket 3, the housing 4, and the like rotate about the pivot 20 during the angle adjustment of the screen and the like, the knob 5 does not move to the specified position of the first position or the second position. In this way, the inner rear-view device for the vehicle 1 according to this first embodiment does not have a trouble caused by movement of the knob 5, that is, such a trouble that the switch 61 interlocking with the operation of the knob 5 is actuated and the display 60 is turned on/off or such a trouble that the screen of the display 60 before the angle adjustment of the screen and the like is changed to the surface of the mirror 62 after the angle adjustment of the screen and the like, or the reflective surface of the mirror 62 before the angle adjustment of the screen and the like is changed to the screen of the display 60 after the angle adjustment of the screen and the like.

In the inner rear-view device for the vehicle 1 according to this first embodiment, the rear-view unit 6 having the display 60, the switch 61, and the mirror 62 is attached to the housing 4. For this reason, in the inner rear-view device for the vehicle 1 according to this first embodiment, the stay 2, the ball joint (the pivot 20, the bracket 3 and the like), the housing 4, the knob 5, and the switching mechanism 7 can be used for both of the rear-view unit 6 and an anti-glare mirror.

In addition, the inner rear-view device for the vehicle 1 according to this first embodiment can switch between the display surface 63 and the reflective surface of the mirror 62 of the display 60 in the rear-view unit 6 by switching the knob 5 between the first position and the second position, so as to switch the housing 4 and the like between the first posture and the second posture. Accordingly, the inner rear-view device for the vehicle 1 according to this first embodiment uses an existing technique of the knob 5 and the like, so as to be able to switch between the display surface 63 and the reflective surface of the mirror 62 of the display 60 in the rear-view unit 6 by the existing switching operation of the knob 5.

In the inner rear-view device for the vehicle 1 according to this first embodiment, the knob 5 includes the main body 50, the shooting section 51, the shaft section 52, and the elastically-engaged section 71, the elastically-deformed section 72, and the suppressing section 73 in the switching mechanism 7, and the bracket 3 includes the fixed engagement section 70 of the switching mechanism 7. For this reason, the inner rear-view device for the vehicle 1 according to this first embodiment can reliably switch the housing 4 and the like between the first posture and the second posture by the switching operation of the knob 5 between the first position and the second position.

In the inner rear-view device for the vehicle 1 according to this first embodiment, the suppressing section 73 provided on the knob 5 abuts the housing 4, and the elastic deformation of the elastically-deformed section 72 provided on the knob 5 is thereby suppressed. Thus, the elastic deformation of the elastically-deformed section 72 can reliably be suppressed.

(Description on Second Embodiment)

Figure 8:
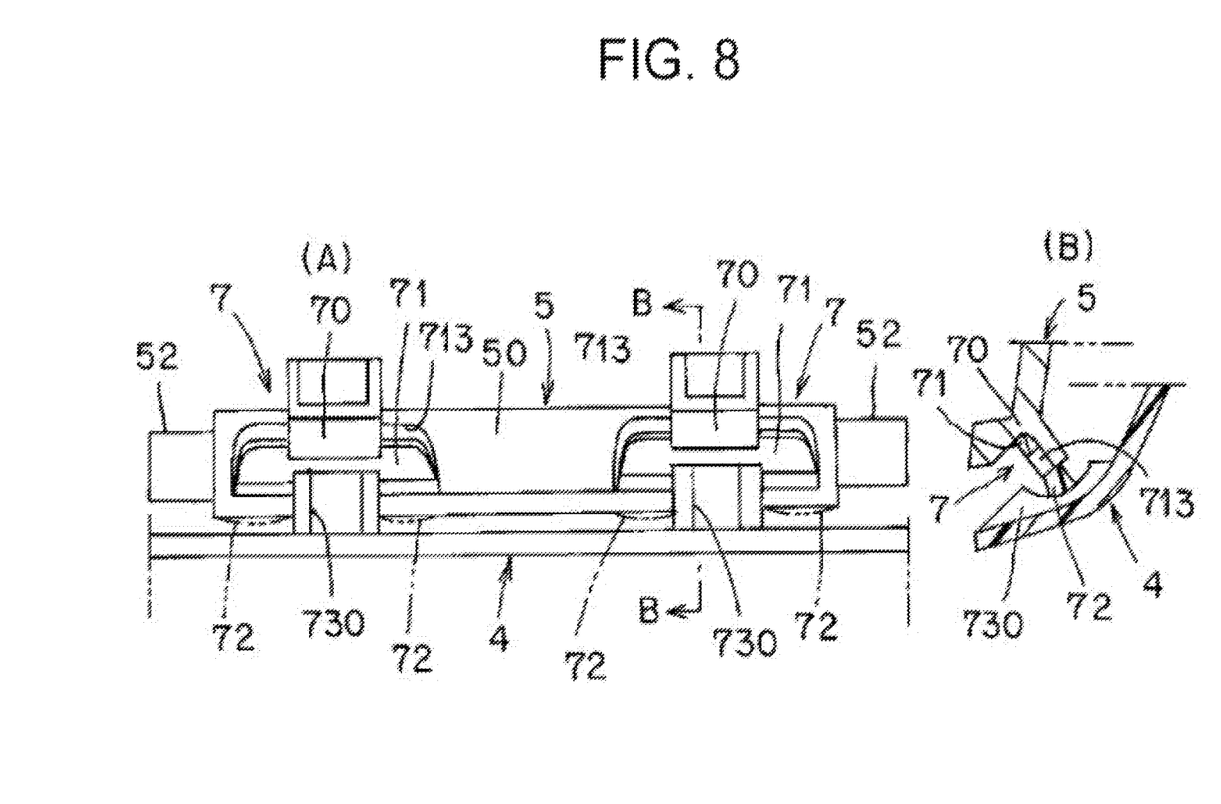
FIG. 8 includes explanatory views of elastic deformation of an elastically-deformed section and an actuation state of a suppressing section in a second embodiment of an inner rear-view device for a vehicle according to the present invention, in which (A) is a partial front explanatory view and (B) is a cross-sectional explanatory view taken along B-B line in (A).

FIG. 8 illustrates a second embodiment of an inner rear-view device for a vehicle according to the present invention. A description will hereinafter be made on the inner rear-view device for the vehicle according to this second embodiment. In the drawings, the same reference numerals and symbols as those in FIG. 1 to FIG. 7 and FIG. 9 are used.

In the inner rear-view device for the vehicle 1 according to the first embodiment, the suppressing section 73 is integrally provided on the knob 5 and abuts the housing 4. Meanwhile, in the inner rear-view device for the vehicle according to this second embodiment, a suppressing section 730 is integrally provided on the housing 4 and abuts an elastically-deformed section 72.

Since the inner rear-view device for the vehicle according to this second embodiment is configured as described so far, the inner rear-view device for the vehicle according to this second embodiment can exert substantially the same operational effects as those of the inner rear-view device for the vehicle 1 according to the first embodiment.

(Description on Examples Other Than First and Second Embodiments)

In the first and second embodiments, the rear-view unit 6 includes the display 60, the switch 61, and the mirror 62. However, in the present invention, instead of having the display 60, the switch 61, and the mirror 62 as the rear-view unit, a normal mirror, the anti-glare mirror, or the like may be provided, for example.

In the first embodiment, the suppressing section 73 is provided on the knob 5 and abuts the housing 4. Meanwhile, in the second embodiment, the suppressing section 730 is provided on the housing 4 and abuts the knob 5. However, in the present invention, the suppressing section may be provided on at least one of the knob 5, the housing 4, and the bracket 3, and the suppressing section provided on the knob 5 may abut at least one of the housing 4 and the bracket 3. Alternatively, the suppressing section provided on the housing 4 and the suppressing section provided on the bracket 3 may abut the elastically-deformed section.

The present invention is not limited to the first and second embodiments.

DESCRIPTION OF REFERENCE NUMERALS AND SYMBOLS

1: Inner rear-view device for vehicle
2: Stay
20: Pivot
21: Base (attachment mechanism)
22: Front windshield
23: Ceiling
24: Cover
3: Bracket
30: Ball recess
31: Through hole
32: Insertion hole
33: Locking section
34: Shaft section
35: Switch abutment section
4: Housing
40: Rim
41: Upper through hole
42: Lower through hole
43: Notch
44: First shaft section
45: Second shaft section
46: Window
47: First stopper surface
48: Second stopper surface
5: Knob
50: Main body
51: Shooting section
52: Shaft section
53: First stopper surface
54: Second stopper surface
6: Rear-view unit
60: Display
61: Switch
62: Mirror
63: Display surface
64: Imaging device
65: Signal line
66: Adjustment section
67: Actuator
7, 7A: Switching mechanism
70: Fixed engagement section
700: Recess 701: First stopper surface
702: Second stopper surface
71: Elastically-engaged section
710: Projection
711: First stopper surface
712: Second stopper surface
713: Long hole
72, 72A: Elastically-deformed section
73, 730: Suppressing section
8: Bush
80: Pressing plate
81: Screw
82: Through hole
83: Opening
84: Screw hole
B: Back
D: Down
F: Front
F1: Housing operating force
F2: Knob operating force
F3: Knob torque (knob operation load)
F4: Input component (bracket input component of housing operating force)
F5: Input component (bracket input component of knob operating force)
L: Left
L1: Distance (distance between pivot center and housing operating force input point)
L2: Knob operating length
L3: Knob bracket abutment surface length
L4: Distance (distance between first rotation center line and input point)
L5: Distance (distance between first rotation center line and fulcrum)
OP: Center of Pivot 20
O1: First rotation center line (center line of shaft section 34)
O2: Second rotation center line (center line of shaft section 52)
P: Driver
P1: Input point (housing operating force input point)
R: Right
S: Fulcrum
SL1: Line segment (line segment between input point and pivot center)
SL2: Line segment (line segment between input point and first rotation center line)
SL3: Line segment (line segment between first rotation center line and fulcrum)
T1: Pivot torque
T2: Rotation torque (bracket rotation torque by housing operating force)
T3: Rotation torque (bracket rotation torque by knob operating force)
U: Up
V: Vehicle
Z: Range
θ1: Angle (angle between housing operating force and input component at input point)
θ2: Angle (angle between knob operating force and input component at fulcrum)

The invention claimed is:

1. An inner rear-view device for a vehicle comprising:
a stay, one end of which is attached to a vehicle body via an attachment mechanism;
a pivot provided at another end of the stay;
a bracket rotatably attached to the pivot;
a housing attached to the bracket in a manner to be rotatable between a first posture and a second posture;
a knob attached to the housing and engaged with the bracket in a manner capable of being switched between a first position and a second position;
a rear-view unit attached to the housing and used to visually recognize a place behind a vehicle; and
a switching mechanism switching the housing from the first posture to the second posture or from the second posture to the first posture when the knob is switched from the first position to the second position or from the second position to the first position, the switching mechanism including:
a fixed engagement section provided on the bracket;
an elastically-engaged section provided on the knob and elastically engaged with the fixed engagement section and an elastically-deformed section elastically deformed when the knob is switched; and
a suppressing section suppressing elastic deformation of the elastically-deformed section.

2. The inner rear-view device for the vehicle according to claim 1, wherein
the rear-view unit includes:
a display for displaying an image of a situation behind the vehicle, which is captured by an imaging device, on a display surface;
a switch actuating the display when the housing is switched to the first posture and stopping the display when the housing is switched to the second posture; and
a mirror provided on a surface or a surface side of the display surface, transmitting the image on the display surface when the housing is in the first posture, and reflecting the situation behind the vehicle as a reflected image when the housing is in the second posture.

3. The inner rear-view device for the vehicle according to claim 1, wherein
the knob includes:
a main body;
a shooting section provided in the main body for switching operation of the knob;
a shaft section that is provided in the main body in a direction crossing a direction in which the shooting section is provided, and is rotatably attached to the housing; and
the elastically-engaged section and the elastically-deformed section provided in the main body.

4. The inner rear-view device for the vehicle according to claim 1, wherein
the suppressing section is provided on at least one of the knob, the housing, and the bracket,
the suppressing section provided on the knob abuts at least one of the housing and the bracket, and
the suppressing section provided on the housing and the suppressing section provided on the bracket abut the elastically-deformed section.

5. The inner rear-view device for the vehicle according to claim 1, wherein the rear-view unit is configured to visually display the place behind the vehicle.

6. The inner rear-view device for the vehicle according to claim 2, wherein the display is configured to display a scene behind the vehicle.

* * * * *

UNITED STATES PATENT AND TRADEMARK OFFICE
CERTIFICATE OF CORRECTION

| | | |
|---|---|---|
| PATENT NO. | : 10,940,799 B2 | Page 1 of 1 |
| APPLICATION NO. | : 16/637482 | |
| DATED | : March 9, 2021 | |
| INVENTOR(S) | : Kenji Nozaki et al. | |

It is certified that error appears in the above-identified patent and that said Letters Patent is hereby corrected as shown below:

On the Title Page

Item (87), the PCT Publication Number is incorrect, Item (87) should read:
-- (87) PCT Pub. No.: WO2019/031542
PCT Pub. Date: Feb. 14, 2019 --

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*